(12) United States Patent
Agrawal et al.

(10) Patent No.: US 9,699,247 B2
(45) Date of Patent: Jul. 4, 2017

(54) USER EXPERIENCE MONITORING FOR APPLICATION REMOTING

(71) Applicant: VMware, Inc., Palo Alto, CA (US)

(72) Inventors: Banit Agrawal, Cupertino, CA (US); Rishi Bidarkar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 378 days.

(21) Appl. No.: 14/307,177

(22) Filed: Jun. 17, 2014

(65) Prior Publication Data

US 2015/0365498 A1    Dec. 17, 2015

(51) Int. Cl.
*G06F 15/16*     (2006.01)
*H04L 29/08*     (2006.01)
*G06F 21/60*     (2013.01)

(52) U.S. Cl.
CPC ............ *H04L 67/08* (2013.01); *G06F 21/606* (2013.01); *G06F 21/608* (2013.01); *H04L 67/36* (2013.01)

(58) Field of Classification Search
CPC ....... H04L 67/08; H04L 67/36; G06F 21/606; G06F 21/608
USPC ......................................................... 709/203
See application file for complete search history.

(56) References Cited

U.S. PATENT DOCUMENTS

| | | |
|---|---|---|
| 7,106,347 B1 | 9/2006 | Rosenberg |
| 8,127,233 B2 | 2/2012 | McDowell |
| 8,341,624 B1 | 12/2012 | Hobbs |
| 8,396,122 B1 | 3/2013 | Taylor |
| 8,453,148 B1 | 5/2013 | Hobbs |
| 8,489,704 B1 | 7/2013 | Mendez |
| 8,743,954 B1 | 6/2014 | Masterson |
| 8,774,536 B1 | 7/2014 | Jia |
| 8,902,248 B1 | 12/2014 | Bidarkar et al. |
| 8,972,893 B2 | 3/2015 | Duncan |
| 9,235,313 B2 | 1/2016 | Wu |
| 2003/0099411 A1 | 5/2003 | Kokemohr |
| 2004/0098731 A1 | 5/2004 | Demsey |
| 2004/0125110 A1 | 7/2004 | Kohda |
| 2004/0205514 A1 | 10/2004 | Sommerer |
| 2005/0010861 A1 | 1/2005 | Augustyn et al. |
| 2005/0124389 A1 | 6/2005 | Yang |
| 2006/0078051 A1 | 4/2006 | Liang et al. |
| 2007/0009045 A1 | 1/2007 | Mohandas |
| 2008/0155454 A1 | 6/2008 | Balasubramanian |
| 2009/0128491 A1 | 5/2009 | Katayama |

(Continued)

*Primary Examiner* — Wing F Chan
*Assistant Examiner* — Joseph Maniwang

(57) ABSTRACT

Methods, systems, and computer programs for user experiencing monitoring for application remoting. One of the methods includes receiving a request to provide an application to a remote client. The application is executed to generate one or more application windows. A watermark window that includes a watermark is generated. Display data for the application is, generated, including the watermark window and the one or more application windows. The display data for the application is provided to the remote client for presentation on the remote client. Data identifying an operation to be performed by the application is obtained. The watermark is updated to encode information identifying the operation and information identifying an initialization of the operation by the application. Data identifying a completion of the operation is received by the application. The watermark is updated to encode information identifying the completion of the operation.

20 Claims, 8 Drawing Sheets

(56) References Cited

U.S. PATENT DOCUMENTS

| | | |
|---|---|---|
| 2009/0153585 A1 | 6/2009 | Mahajan |
| 2009/0210817 A1 | 8/2009 | Schmieder |
| 2009/0222739 A1 | 9/2009 | Schmieder |
| 2009/0234940 A1 | 9/2009 | Pal et al. |
| 2009/0319933 A1 | 12/2009 | Zaika |
| 2010/0020875 A1 | 1/2010 | Macq |
| 2010/0064260 A1 | 3/2010 | Amano |
| 2010/0161711 A1 | 6/2010 | Makhija et al. |
| 2010/0162338 A1 | 6/2010 | Makhija et al. |
| 2011/0010629 A1 | 1/2011 | Castro |
| 2011/0199389 A1 | 8/2011 | Lu |
| 2011/0276900 A1 | 11/2011 | Khan |
| 2012/0042252 A1 | 2/2012 | Neerudu |
| 2012/0307074 A1 | 12/2012 | Bhagavathy |
| 2013/0067331 A1 | 3/2013 | Glazer |
| 2013/0097426 A1* | 4/2013 | Agrawal ............... G06T 1/0021 713/176 |
| 2013/0132971 A1 | 5/2013 | Assuncao |
| 2013/0156100 A1 | 6/2013 | Matsui |
| 2013/0166629 A1 | 6/2013 | Ivashin |
| 2013/0187916 A1 | 7/2013 | Toy |
| 2013/0290856 A1 | 10/2013 | Beveridge |
| 2014/0153457 A1 | 6/2014 | Liu |
| 2014/0226901 A1 | 8/2014 | Spracklen |
| 2014/0320673 A1 | 10/2014 | Agrawal |
| 2015/0009222 A1 | 1/2015 | Diard |
| 2015/0019694 A1 | 1/2015 | Feng |
| 2015/0030084 A1 | 1/2015 | Marchya et al. |
| 2015/0043312 A1 | 2/2015 | Wu |
| 2015/0046852 A1 | 2/2015 | Furtwangler |
| 2015/0127716 A1 | 5/2015 | Agrawal et al. |
| 2015/0180933 A1 | 6/2015 | Spracklen et al. |
| 2015/0181207 A1 | 6/2015 | Agrawal et al. |
| 2015/0186102 A1 | 7/2015 | Yamaguchi |
| 2015/0194136 A1 | 7/2015 | Diard |
| 2015/0312599 A1 | 10/2015 | Brockmann |
| 2016/0073113 A1 | 3/2016 | Rintaluoma |

* cited by examiner

USER EXPERIENCE MONITORING FOR APPLICATION REMOTING

BACKGROUND

This document relates to application remoting.

Applications can be executed on a server and provided to remote clients over a network, e.g., the Internet. The applications can be hosted on a server remote from the client and a user can interact with the remote applications using a variety of remote clients, including desktops, laptops, thin clients, smart phones, tablets, and so on.

Remote display protocols can be used to transfer the display of an application executing on a server to the remote client. During execution, the application can generate updates to the display, and the remote display protocol can transfer the updated display data to the remote client.

SUMMARY

In general, one innovative aspect of the subject matter described in this specification can be embodied in methods that include the actions of: receiving, by a computer system, a request to provide an application to a remote client; executing the application on the computer system to generate one or more application windows; generating a watermark window that includes a watermark; generating display data for the application, wherein the display data for the application comprises the watermark window and the one or more application windows; providing, for presentation on the remote client, the display data for the application to the remote client in response to the request; obtaining data identifying an operation to be performed by the application; updating the watermark to encode information identifying the operation and information identifying an initialization of the operation by the application; and receiving data identifying a completion of the operation by the application and updating the watermark to encode information identifying the completion of the operation.

These and other embodiments can each optionally include one or more of the following features. The actions include receiving a determination of a response time from the remote client, wherein the response time is determined based on the information identifying the initialization of the operation and the completion of the operation encoded in the watermark. Providing the display data to the client comprises: providing the watermark window and the application windows for presentation on the remote client with the watermark window overlapping at least one of the application windows. The actions include configuring the watermark window as an always-on-top window relative to the application windows when presented on the remote client. The request is a request for display data to be presented in a designated application window on the remote client, and wherein providing the display data for the application to the remote client comprises providing the application windows and the watermark window for presentation in the designated application window. The watermark comprises a plurality of lines, and each line comprises a respective plurality of binary pixels. Updating the watermark to encode information identifying the operation comprises: encoding a first line of the plurality of lines with data identifying the operation. Updating the watermark to encode information identifying the initialization of the operation comprises: encoding a second line of the plurality of lines with data identifying the start of the operation. Updating the watermark to encode information identifying the completion of the operation comprises: encoding a third line of the plurality of lines with data identifying the end of the operation. The actions include receiving, by the remote client, the watermark that includes information identifying the operation; receiving, by the remote client, the watermark that includes information identifying the start of the operation; determining, by the remote client, a first time that the watermark that includes the information identifying the start of the operation was received; receiving, by the remote client, the updated watermark that includes information identifying the completion of the operation; determining, by the remote client, a second time that the updated watermark was received; determining, by the remote client, a response time from the first time and the second time; and providing, by the remote client, the response time to the computer system.

The subject matter described in this specification can be implemented in particular embodiments so as to realize one or more of the following advantages. A server can provide remote application functionality to a client and determine response times to the application in a more effective manner. The server can include a watermark as part of display data for an application to measure response times at the client location without interfering with important functionality of the application or harming the user experience. Response times can be measured in environments where only application windows are provided to remote clients rather than entire desktops.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1A:
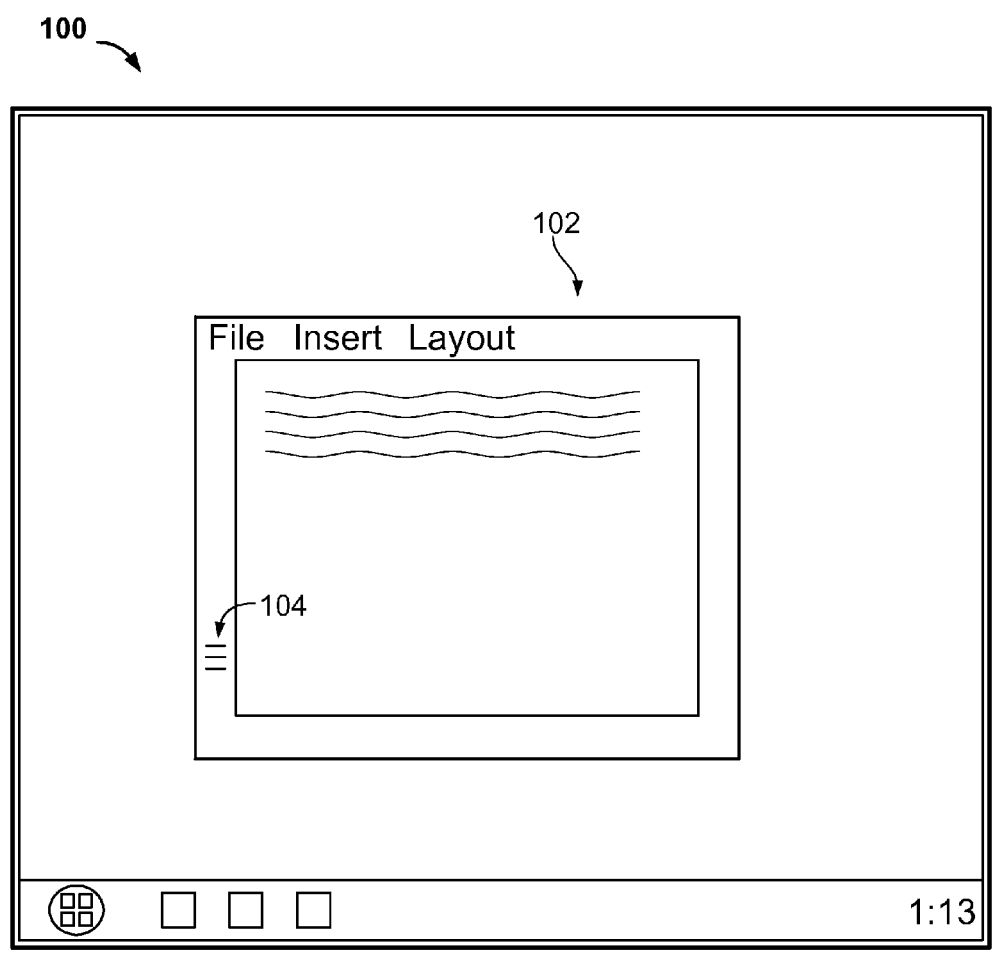
FIG. 1A is an example user interface displayed on a remote client.

FIG. 1A shows an example user interface 100 displayed on a remote client. In the example of FIG. 1A, the remote client is displaying a remote application window 102 in the user interface 100. The remote application window 102 is generated by a remote application. A remote application is an application executing on a computer system, distinct from the remote client, which provides display data for the application to the remote client over a network.

The remote client also displays a watermark window 104 in the user interface 100. The watermark window 104 is included in the received display data for the remote application and includes a watermark for the remote application. The watermark is an image used by the system executing the application to encode information relevant to the execution of the application. An example watermark is described below with reference to FIG. 2.

In the example of FIG. 1A, the watermark window 104 is displayed on the remote client so that it overlaps the remote application window 102. For example, the system executing the remote application may have included the watermark window 104 with the remote application window 102 as the display data for the remote application. In some implementations, the watermark window 104 is an always-on-top window, i.e., the window is configured such that the watermark window 104 is always displayed on top of the remote application window 102 or any other open remote application window in the user interface 100 of the remote client.

Figure 1B:
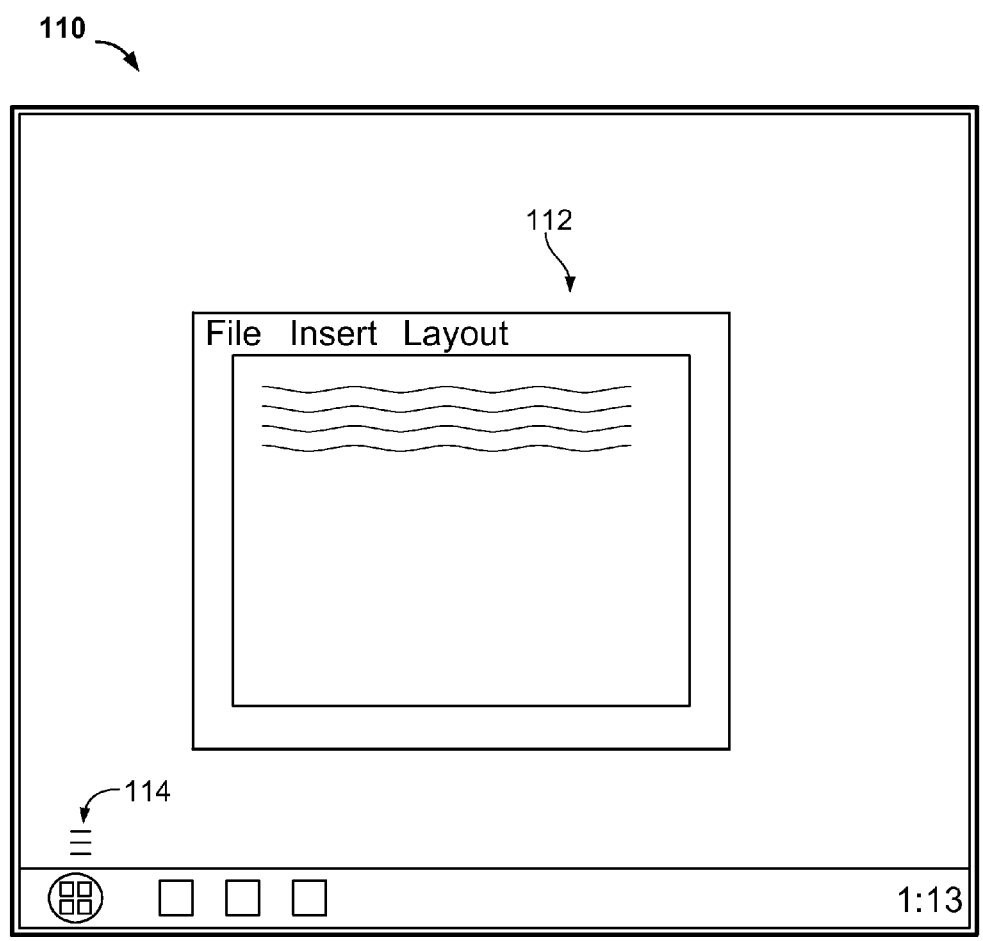
FIG. 1B is an example user interface displayed on a remote client.

FIG. 1B shows an example user interface 110 displayed on a remote client. In this example, the watermark window 114 is displayed in a different portion of the user interface 110 than the watermark window 104 included in FIG. 1A, e.g., so that it does not overlap the application window 112.

Figure 2:
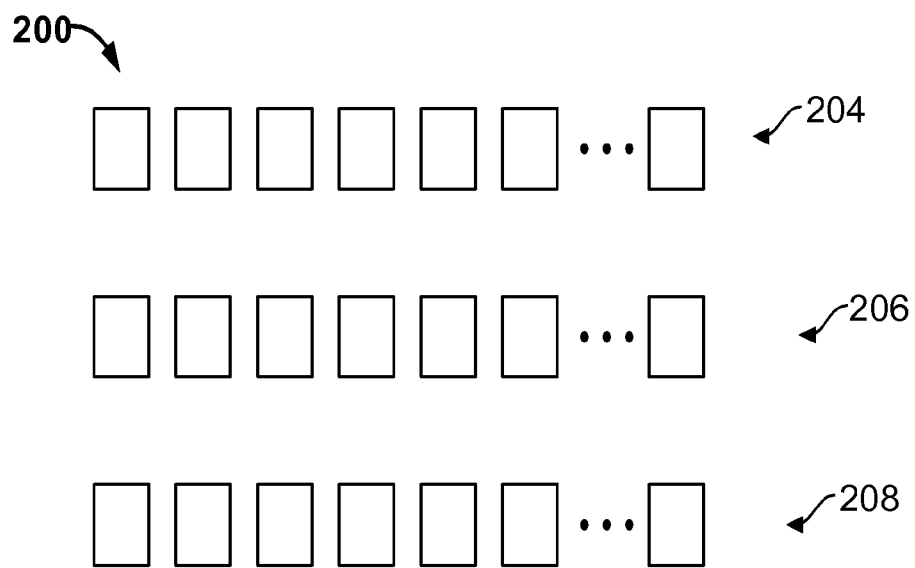
FIG. 2 illustrates an example of a watermark included in display data for a remote application.

FIG. 2 illustrates an example of a watermark 200 included in display data for a remote application. In the example of FIG. 2, the watermark 200 is an image that includes three lines of binary pixels 202, 204, 206. A binary pixel is a pixel that is assigned two possible sets of RGB tuple values. The first line of binary pixels 204 is used to encode an operation ID that identifies an operation to be performed by the remote application, e.g., in response to a user request. For example, the operation ID can encode information identifying a new file operation, a new browser tab operation, or a save operation. A watermark that encodes an operation ID is described below, with reference to FIG. 6.

The second line of binary pixels 206 is used to encode a start operation identifier that indicates to the remote client that the application has begun the operation identified by the operation ID. The remote client can use the identifier to determine a response time for the operation, as described below with reference to FIG. 7. A watermark that encodes a start operation identifier is described below, with reference to FIG. 6.

The third line of binary pixels 208 is used to encode an end operation identifier that indicates to the remote client that the application has completed the operation identified by the operation ID. The remote client can use the identifier to determine a response time for the operation as described below with reference to FIG. 7. A watermark that encodes an end operation identifier is described below, with reference to FIG. 6.

Figure 3:
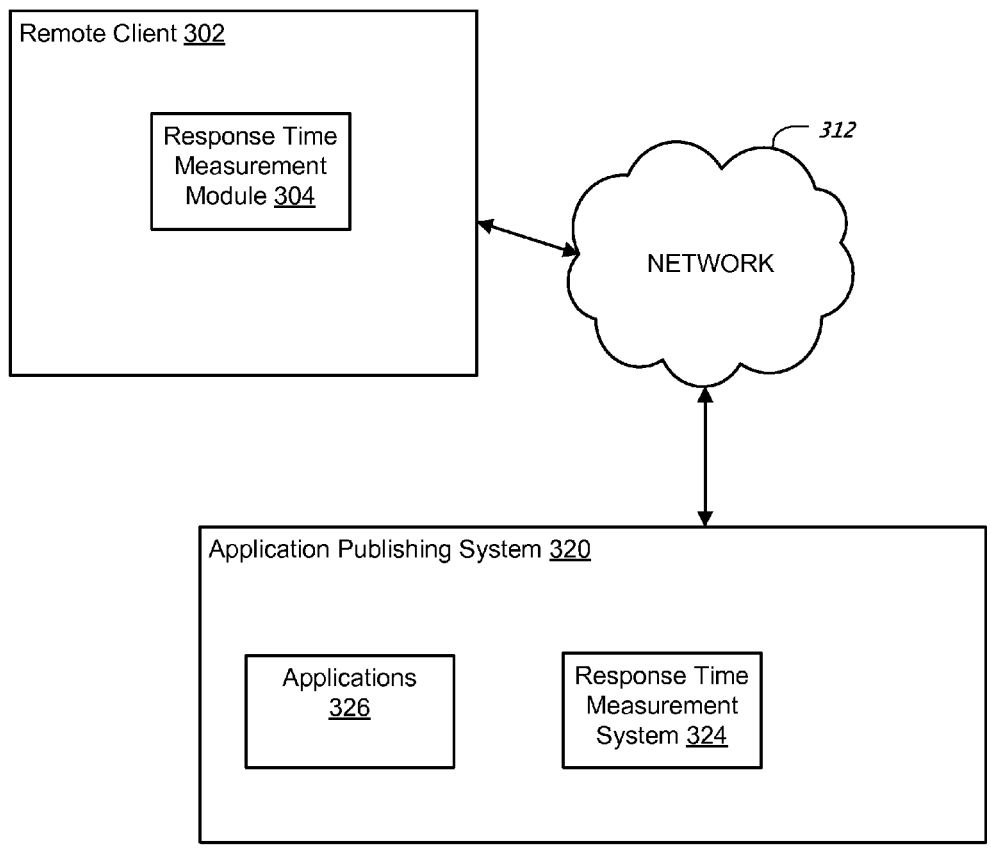
FIG. 3 shows an example application publishing system.

FIG. 3 shows an example application publishing system 320. The application publishing system 320 is an example of a system implemented as computer programs on one or more computers in one or more locations, in which the systems, components, and techniques described below, are implemented.

The application publishing system 320 can provide one or more applications 326, e.g., Internet browsers, word processing applications, slide-based presentation creating programs, or Integrated Development Environments, to one or more remote clients, e.g., remote client 302, through a network 312. The network can be, for example, a local area network, wide area network, e.g., the Internet, a virtual network, or a combination of networks.

The remote client 302 can be a computer, mobile device, or a simulated remote client running on a computer. In implementations where the remote client is simulated, the remote client can be a virtual machine or other software executing on a computer. Each remote client includes a memory, e.g., a Random Access Memory (RAM), and one or more processors. In implementations where the remote client is a simulated remote client, the physical hardware layer can be abstracted by the use of virtual RAM and virtual processors assigned to the simulated remote client in a virtual machine.

The application publishing system 320 provides applications 326 to the remote client 302 by executing each of the applications and providing display data generated by the application to the remote client 302. The application publishing system 320 transmits the display data to each remote client 302 using a display protocol, e.g., PC-over-IP (PCoIP) or Remote Desktop Protocol. The remote client 302 receives the display data for the application and presents the display data to a user of the remote client. The remote client can receive user inputs interacting with the presented display data and provide data identifying the user inputs to the application publishing system 320. For example, the remote client can receive a user interaction with the display data, e.g., a click or touch input on the display data of the remote application, and provide data identifying the interaction to the application publishing system 320.

The application publishing system 320 includes or can communicate with a response time measurement system 324 that generates a watermark, e.g., the watermark 106 of FIG. 1A, to include in the display data of an application being provided to the remote client 302 by the application publishing system 320. The information included in the watermark can be modified by the response time measurement system 324 according to data received from the remote client 302 or from the application publishing system 320. For example, the information included in the watermark can be modified to encode an operation identified by an input received from the remote client 302. As another example, the information included in the watermark can be modified to encode a start operation identifier in response to receiving data from the application publishing system 320 indicating that the operation has been initiated. As another example, the information included in the watermark can be modified to encode an end operation identifier in response to receiving data from the application publishing system 320 indicating that the operation has been completed.

The remote client 302 includes a response time measurement engine 304 that detects the watermark included in the display data provided by the application publishing system 320. The response time measurement engine 304 identifies the location of the watermark in the display data and uses the information displayed in the watermark to measure response times 316 for selected operations. A response time for a particular operation is the time difference between the time when information identifying the start of the operation is presented in the watermark on the remote client 302 and the time when information identifying the completion of the operation is presented in the watermark on the remote client 302. The response time measurement engine 304 can provide the measured response times to the application publishing system 320, e.g., for use in evaluating the performance of the applications 326 or other computing resources.

Figure 4:
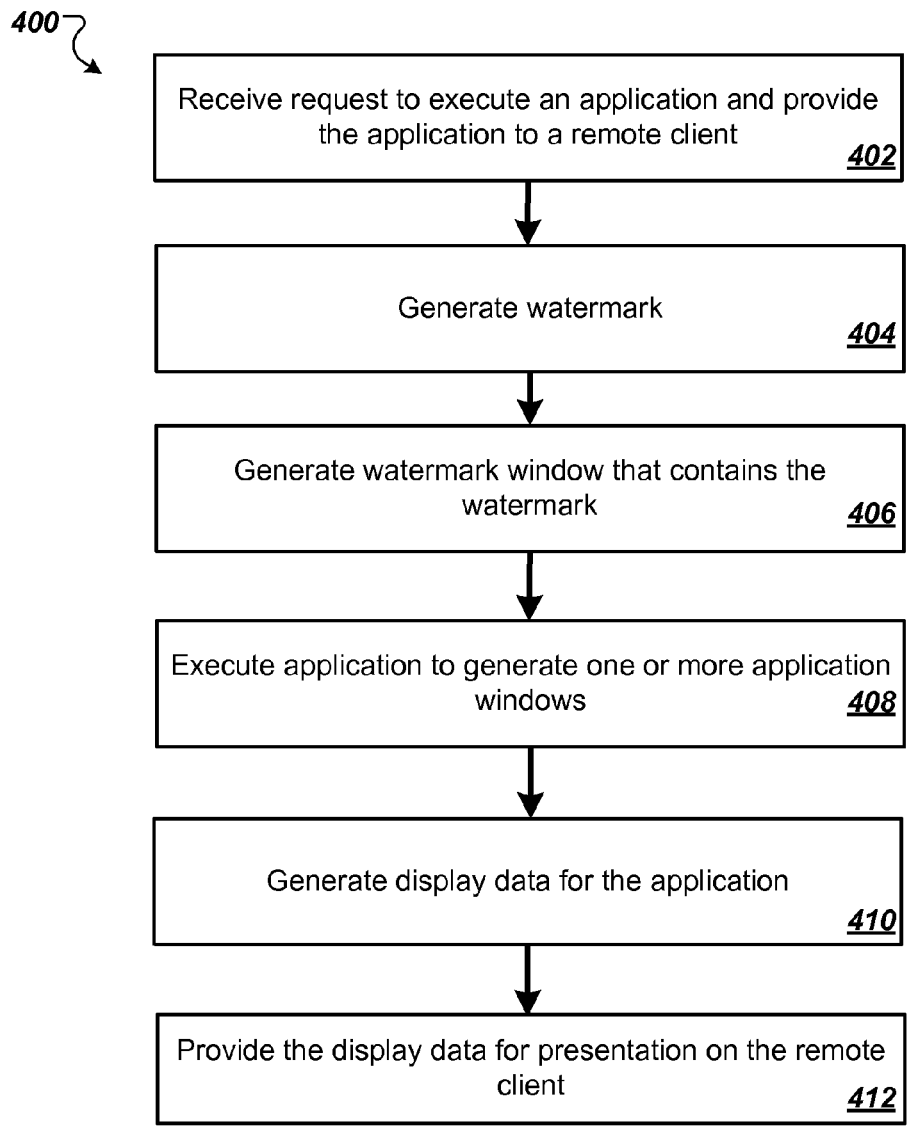
FIG. 4 illustrates an example process for providing a watermark with application display data

FIG. 4 illustrates an example process 400 for providing a watermark with application display data. The process 400 will be described as being performed by a system of one or more appropriately programmed computers, e.g., the response time measurement system 324 of FIG. 3.

The system receives a request to execute an application and provide the application to a remote client (step 402).

In response to receiving the request, the system generates a watermark for the application (step 404). As described above with reference to FIGS. 1 and 2, the watermark is an image used by the system to encode information relevant to the execution of the application.

The system generates a watermark window that contains the watermark for the application (step 406). For example, the watermark can be generated by the response time measurement system 324 of FIG. 3.

The system executes the application to generate one or more application windows (step 408).

The system generates display data for the application to be provided to the remote client (step 410). The display data includes the one or more application windows generated by the application and the watermark window for the application. For example, in order to include the watermark window with the display data for the application, the system can wrap the application around a script that, in response to receiving a request to execute an application, combines the watermark window with the application windows to generate the display data that is provided to the remote client as the display data for the application.

The system optionally designates the watermark window as an always-on-top window relative to each open application window. That is, the system configures the watermark window so that, when the watermark window is displayed so that it overlaps any of the open application windows on the remote client, the watermark window is always displayed on top of the application window. In particular, the system can configure the watermark window as an always-on-top window by providing information to the client identifying that the watermark window should overlap any open application windows. For example, the system can provide data defining a z-order of the application windows to the remote client and cause the remote client to display any overlapping windows in accordance with the z-order. The z-order defines the ordering of a stack of windows, so that when two or more windows overlap, the window with the highest z-order is displayed on top of the other windows. In order to configure the watermark window as an always-on-top window, the system assigns the watermark window the highest z-order of any of the windows provided as display data to the remote client. Furthermore, the location of the watermark window relative to the application windows may be selected by the system to be away from important functionality of the application, e.g., away from commonly selected buttons or actions of the application, or away from the visual notice of a user, e.g., in a corner of the application.

The system provides the display data for the application for presentation on the remote client (step 412). The system uses a display protocol to transmit the display data to the remote client. In some implementations, the system provides data identifying the location of the watermark window in the display data. For instance, if the watermark is configured to be displayed in a lower corner of an application window, the system can provide a pixel location of a start of the watermark, e.g., a specific corner of the watermark, or the center of the watermark. In some other implementations, the system can configure the watermark window to be displayed at a specified location relative to the application windows. In some other implementations, the remote client can analyze the display data to determine the location of the watermark after the display data is provided for presentation.

Figure 5:
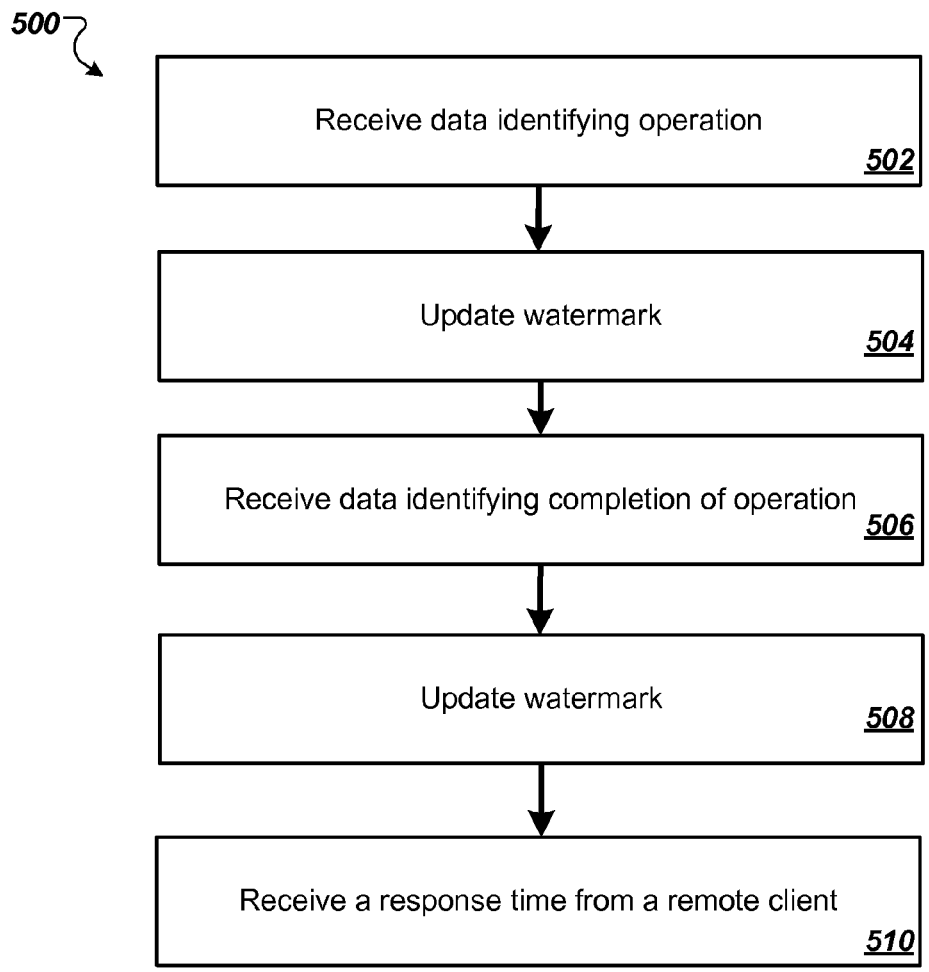
FIG. 5 illustrates an example process for determining response times using watermark data.

FIG. 5 illustrates an example process 500 for determining response times using watermark data. The process 500 will be described as being performed by a system of one or more appropriately programmed computers, e.g., the response time measurement system 324 of FIG. 3.

The system receives data identifying an operation to be performed by an application that has been provided to a remote client (step 502). That is, the system receives data from an application publishing system, e.g., the application publishing system 320 of FIG. 3, which identifies an operation corresponding to a user input interacting with a remote application that has been received from a remote client. For example, the application can be a word processing application, and the client operation can be opening a new document. In some implementations, the system maintains a list of operations for each of the applications it can provide to a remote client. The list can be stored as a data structure, e.g., a database where a list of operations is mapped to an application, or as a list of operations with each operation having one or more labels corresponding to an application that allows the operation.

The system receives data identifying that the application has initialized the operation from the application publishing system and generates an updated watermark to encode data identifying the operation and data identifying the initialization of the operation (step 504). Updating the watermark to encode information is described below, with reference to FIG. 6.

The system receives data identifying that the application has completed the operation from the application publishing system (step 506) and generates an updated watermark to encode data identifying the completion of the operation (step 508). As noted above, updating the watermark to encode information is described below, with reference to FIG. 6. The watermark window with the updated watermark is provided to the remote client along with the display data from the application.

The system receives a measured response time from the remote client (step 510). The response time is measured by the remote client from the time difference between the starting of the operation and the completion of the operation, as received by the remote client using the data encoded in the watermark. Determining a response time using watermark data is described below, with reference to FIG. 7.

Figure 6:
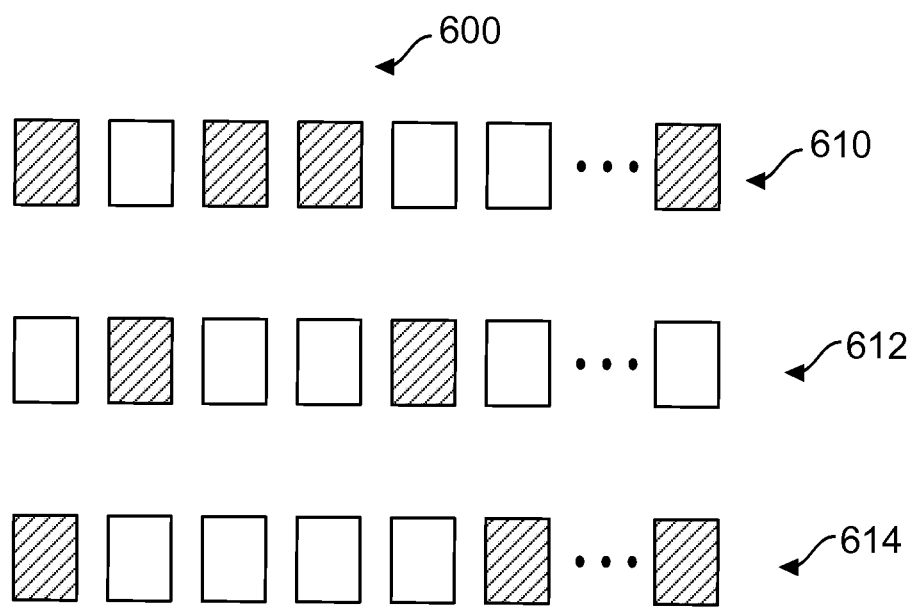
FIG. 6 shows an example watermark encoded with application information.

FIG. 6 shows an example watermark 600 encoded with application information. A first row of pixels 610 of the watermark 600 encodes an operation ID. The operation ID is a number that uniquely identifies an operation to be performed by a remote application. In some implementations, the system can store a list of operations with respective unique operation ID's. The list of operations can be specific to an application, e.g., the list can include operation ID numbers that identify operations for a single application, or can be a global list, e.g., the list can include operation ID numbers that identify both an operation to be performed and an application. In implementations with a global list, the global list can include an identifier for each application and a separate identifier for each of its respective operations. The system can then determine an operation ID by combining the application identifier with an identifier for an operation. In implementations where each application has its own list, the operation ID can simply correspond to an identification number of the operation. In order to encode the operation ID in the first row of pixels 610, the system converts the operation ID into a binary number and encodes the number in the watermark by assigning each pixel in the first row of pixels 610 either the RGB tuple (0,0,0), i.e., white, or the RGB tuple (255, 255, 255), i.e., black. That is, the system assigns each pixel in the first row a respective RGB tuples so that the sequence of pixels in the first row identifies the operation ID.

A second row of pixels 612 of the watermark 600 identifies the initialization of the operation by the application. In particular, the second row of pixels 612 encodes a start operation identifier, i.e., a binary constant encoded in the watermark that the remote client can recognize, e.g., the constant 35, or 58, or 153, as identifying the initialization of the operation. In some implementations, the application publishing system can initialize the start operation identifier to encode the value 1, and increment the value for each successive start operation identifier.

A third row of pixels 614 of the watermark 600 identifies the completion of the operation by the application. In particular, the third row of pixels 614 encodes an end operation identifier, i.e., a binary constant encoded in the watermark that the remote client can recognize, e.g., the constant 12, or 73, or 197, as identifying the completion of the operation. In some implementations, the application publishing system can initialize the end operation identifier to encode the value 1000, and decrement the value for each successive end operation identifier.

Figure 7:
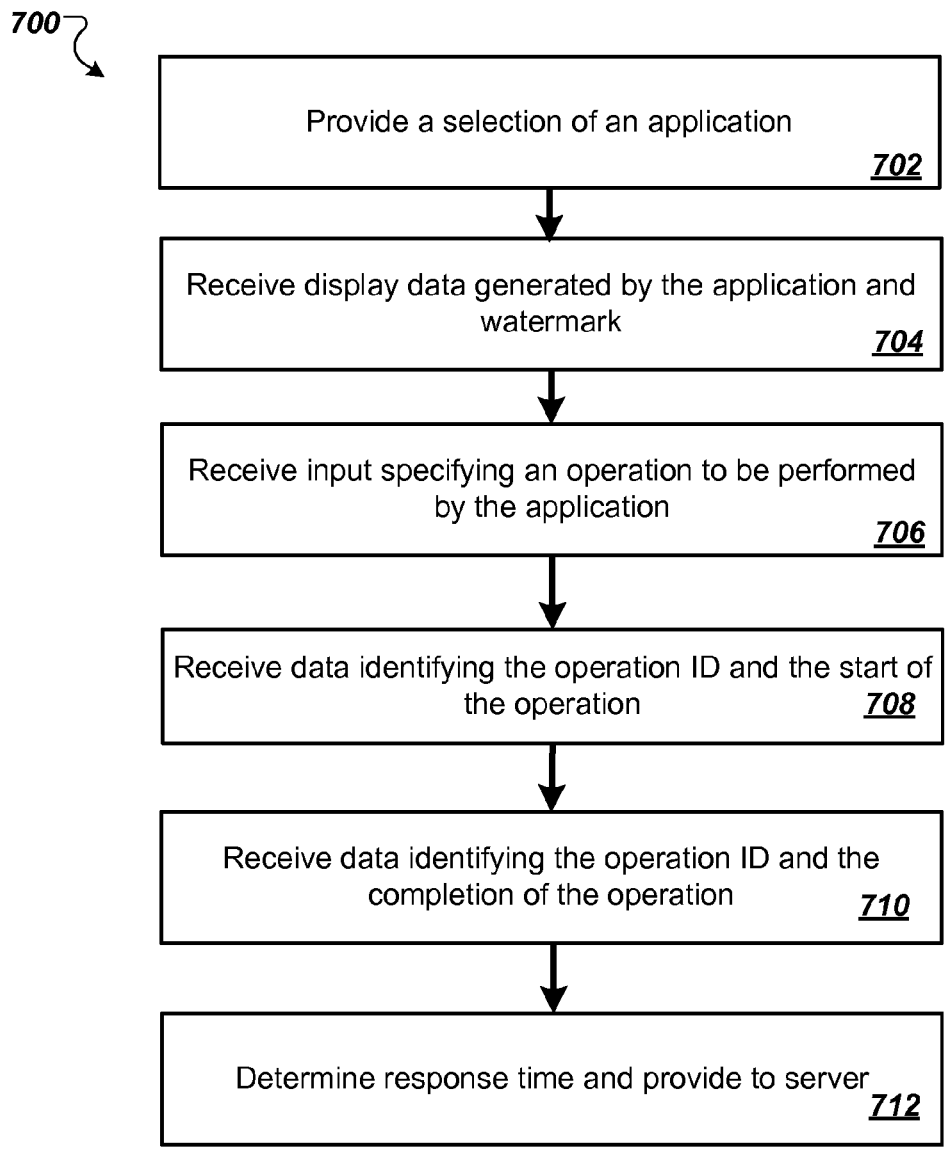
FIG. 7 illustrates an example process of determining a response time at a remote client Like reference numbers and designations in the various drawings indicate like elements.

FIG. 7 illustrates an example process 700 of determining a response time at a remote client. The process 700 will be described as being performed by a remote client, e.g., the remote client 302 of FIG. 3.

The remote client provides a request for a remote application to an application publishing system (step 702).

The remote client receives and presents display data for the application (step 704). The received display data includes a watermark for the application.

In some implementations, the remote client identifies the location of the watermark by analyzing the display data. In other implementations, the application publishing system provides information along with the display data that indicates a location of the watermark in the application. In other implementations, the watermark is located at a specified location.

The remote client receives input specifying an operation to be performed by the application (step 706). In some implementations, a user of the remote client can specify an operation by interacting with the presented display data. In implementations where the remote client is simulated, the operation can be specified from a particular workflow, or selected at random from a list of operations.

The remote client receives an updated watermark that includes an operation ID of an operation to be performed and data identifying the start of the operation (step 708). The remote client stores the operation ID and the time that the data identifying the start was received in memory.

The remote client receives an updated watermark that includes the operation ID of the selected operation, and data identifying the completion of the operation (step 710). The remote client stores the time the data identifying the completion of the operation was received the watermark in memory.

The remote client determines a response time for the operation and provides it to the application publishing system (step 712). The remote client can determine the response by computing the time difference between the time of receipt of the watermark identifying the completion of the operation and the time of receipt of the watermark identifying the start of the operation.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving, by a computer system, a request to provide an application to a remote client;
executing the application on the computer system to generate one or more application windows;
generating a watermark window that includes a watermark, wherein the watermark window is a distinct window from the one or more application windows;
generating display data for the application, wherein the display data for the application comprises the watermark window and the one or more application windows, wherein the display data, when provided to the remote client, presents the watermark window and the one or more application windows directly in a user interface of the remote client without a remote desktop being provided to the remote client;
providing, for presentation on the remote client, the display data for the application to the remote client in response to the request;
obtaining data identifying an operation to be performed by the application;
updating the watermark to encode information identifying the operation and information identifying an initialization of the operation by the application; and
receiving data identifying a completion of the operation by the application and updating the watermark to encode information identifying the completion of the operation.

2. The method of claim 1, further comprising:
receiving a determination of a response time from the remote client, wherein the response time is determined based on the information identifying the initialization of the operation and the completion of the operation encoded in the watermark.

3. The method of claim 1, wherein providing the display data to the remote client comprises:

providing the watermark window and the application windows for presentation on the remote client with the watermark window overlapping at least one of the application windows.

4. The method of claim 3, further comprising:
configuring the watermark window as an always-on-top window relative to the application windows when presented on the remote client.

5. The method of claim 1, wherein the request is a request for display data to be presented in a designated application window on the remote client, and wherein providing the display data for the application to the remote client comprises providing the application windows and the watermark window for presentation in the designated application window.

6. The method of claim 1, wherein the watermark comprises a plurality of lines, and each line comprises a respective plurality of binary pixels.

7. The method of claim 6, wherein updating the watermark to encode information identifying the operation comprises:
encoding a first line of the plurality of lines with data identifying the operation.

8. The method of claim 7, wherein updating the watermark to encode information identifying the initialization of the operation comprises:
encoding a second line of the plurality of lines with data identifying the initialization of the operation.

9. The method of claim 8, wherein updating the watermark to encode information identifying the completion of the operation comprises:
encoding a third line of the plurality of lines with data identifying the completion of the operation.

10. The method of claim 1 further comprising:
receiving, by the remote client, the watermark that includes information identifying the operation;
receiving, by the remote client, the watermark that includes information identifying the initialization of the operation;
determining, by the remote client, a first time that the watermark that includes the information identifying the initialization of the operation was received;
receiving, by the remote client, the updated watermark that includes information identifying the completion of the operation;
determining, by the remote client, a second time that the updated watermark was received;
determining, by the remote client, a response time from the first time and the second time; and
providing, by the remote client, the response time to the computer system.

11. A system comprising:
one or more computers and one or more storage devices storing instructions that are operable, when executed by the one or more computers, to cause the one or more computers to perform operations comprising:
receiving a request to provide an application to a remote client;
executing the application to generate one or more application windows;
generating a watermark window that includes a watermark, wherein the watermark window is a distinct window from the one or more application windows;
generating display data for the application, wherein the display data for the application comprises the watermark window and the one or more application windows, wherein the display data, when provided to the remote client, presents the watermark window and the one or more application windows directly in a user interface of the remote client without a remote desktop being provided to the remote client;
providing, for presentation on the remote client, the display data for the application to the remote client in response to the request;
obtaining data identifying an operation to be performed by the application;
updating the watermark to encode information identifying the operation and information identifying an initialization of the operation by the application; and
receiving data identifying a completion of the operation by the application and updating the watermark to encode information identifying the completion of the operation.

12. The system of claim 11, wherein the operations further comprise:
receiving a determination of a response time from the remote client, wherein the response time is determined based on the information identifying the initialization of the operation and the completion of the operation encoded in the watermark.

13. The system, of claim 11, wherein providing the display data to the remote client comprises:
providing the watermark window and the application windows for presentation on the remote client with the watermark window overlapping at least one of the application windows.

14. The system of claim 13, wherein the operations further comprise:
configuring the watermark window as an always-on-top window relative to the application windows when presented on the remote client.

15. The system of claim 11, wherein the request is a request for display data to be presented in a designated application window on the remote client, and wherein providing the display data for the application to the remote client comprises providing the application windows and the watermark window for presentation in the designated application window.

16. A computer program product, encoded on one or more non-transitory computer storage media, comprising instructions that when executed by one or more computers cause the one or more computers to perform operations comprising:
receiving a request to provide an application to a remote client;
executing the application to generate one or more application windows;
generating a watermark window that includes a watermark, wherein the watermark window is a distinct window from the one or more application windows;
generating display data for the application, wherein the display data for the application comprises the watermark window and the one or more application windows, wherein the display data, when provided to the remote client, presents the watermark window and the one or more application windows directly in a user interface of the remote client without a remote desktop being provided to the remote client;
providing, for presentation on the remote client, the display data for the application to the remote client in response to the request;
obtaining data identifying an operation to be performed by the application;

updating the watermark to encode information identifying the operation and information identifying an initialization of the operation by the application; and receiving data identifying a completion of the operation by the application and updating the watermark to encode information identifying the completion of the operation.

17. The computer program product of claim 16, wherein the operations further comprise:

receiving a determination of a response time from the remote client, wherein the response time is determined based on the information identifying the initialization of the operation and the completion of the operation encoded in the watermark.

18. The computer program product of claim 16, wherein providing the display data to the remote client comprises:

providing the watermark window and the application windows for presentation on the remote client with the watermark window overlapping at least one of the application windows.

19. The computer program product of claim 18, wherein the operations further comprise:

configuring the watermark window as an always-on-top window relative to the application windows when presented on the remote client.

20. The computer program product of claim 16, wherein the request is a request for display data to be presented in a designated application window on the remote client, and wherein providing the display data for the application to the remote client comprises providing the application windows and the watermark window for presentation in the designated application window.

* * * * *